United States Patent
Inoue et al.

(10) Patent No.: US 12,388,377 B2
(45) Date of Patent: Aug. 12, 2025

(54) VIBRATION TYPE ACTUATOR, IMAGING APPARATUS, AND ELECTRONIC EQUIPMENT

(71) Applicant: CANON KABUSHIKI KAISHA, Tokyo (JP)

(72) Inventors: Mei Inoue, Kanagawa (JP); Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 17/874,681

(22) Filed: Jul. 27, 2022

(65) Prior Publication Data

US 2023/0029612 A1 Feb. 2, 2023

(30) Foreign Application Priority Data

Jul. 29, 2021 (JP) ................. 2021-124712

(51) Int. Cl.
*H02N 2/02* (2006.01)
*G03B 13/36* (2021.01)

(52) U.S. Cl.
CPC ............. *H02N 2/026* (2013.01); *G03B 13/36* (2013.01)

(58) Field of Classification Search
CPC .................. G03B 13/36; H02N 2/26
USPC ........................................ 359/823
See application file for complete search history.

(56) References Cited

U.S. PATENT DOCUMENTS

| 5,982,075 A | 11/1999 | Hayasaka |
| 7,129,620 B2 | 10/2006 | Sakano et al. |
| 2017/0317612 A1 | 11/2017 | Noguchi |
| 2019/0245460 A1 | 8/2019 | Yamasaki et al. |

FOREIGN PATENT DOCUMENTS

| JP | 2005-312264 A | 11/2005 |
| WO | 2021/079799 A1 | 4/2021 |

OTHER PUBLICATIONS

Extended European Search Report dated Jan. 16, 2023, in EPO Application No. 22186679.1.

*Primary Examiner* — Wyatt A Stoffa
*Assistant Examiner* — Grant A Gagnon
(74) *Attorney, Agent, or Firm* — Venable LLP

(57) ABSTRACT

A vibration type actuator comprises a vibrator including an electro-mechanical energy conversion element and an elastic member; a holding member holding the vibrator; a guide member guiding the vibrator and the holding member in a first direction; a contact member in contact with the vibrator; and a pressure member pressurizing the vibrator and the contact member in a second direction intersecting the first direction. The vibrator and the contact member generate power activating in the first direction by a vibration of the vibrator, the holding member engages with the guide member to be rotatable around, as an axis, a third direction intersecting the first and the second directions, the holding member has a recess where the vibrator is held, and an output portion transmitting the power is formed on a part of a wall surface on which the recess is formed.

16 Claims, 9 Drawing Sheets

VIBRATION TYPE ACTUATOR, IMAGING APPARATUS, AND ELECTRONIC EQUIPMENT

BACKGROUND OF THE INVENTION

Field of the Invention

The present invention relates to a vibration type apparatus, an imaging apparatus, and electronic equipment.

Description of the Related Art

Various configuration of vibration wave motors are known as examples of a vibration type actuator using an electro-mechanical energy conversion element such as a piezoelectric element for converting electric energy into mechanical energy. For example, there is known a vibration wave motor having a contact member, a vibrator having two protrusions provided on the front surface of a flat elastic member and a piezoelectric element bonded to a back surface of the elastic member, and a pressure member for pressurizing and contacting the two protrusions and the contact member. Here, the back surface of the elastic member is a surface on which no protrusions, which will be described later, are formed.

In this vibration wave motor, by applying a predetermined AC voltage (hereinafter also referred to as "driving voltage") to the electro-mechanical energy conversion element, elliptical motion or circular motion is generated at the tips of the two protrusions in the plane including a direction connecting the two protrusions and the protruding direction of the protrusions. Thereby, when the contact member receives the frictional drive force from the two protrusions (vibrator), the vibrator and the contact member can be relatively moved (hereinafter also referred to as relative movement) in the direction connecting the two protrusions.

The vibration wave motor obtains power to drive a driven member from such relative movement. Various proposals have been made for an output unit for extracting the power generated by the vibration wave motor.

For example, the vibration wave motor disclosed in Japanese Patent Application Laid-Open No. 2005-312264 has a configuration in which a biasing engagement member penetrated by a coupling stop pin, a pin member located at a position apart from the coupling stop pin in the biasing engagement member, and a spiral spring located at a position further apart from the coupling stop pin are provided, and a vibrator is urged against a shaft through a biasing engagement member. That is, in the disclosed configuration, the coupling stop pin is used as a fulcrum, the contact point between the biasing engagement member and the pin member is used as a working point, and the spiral spring is arranged at an effort point. By being urged by the spiral spring, the two vibrators are brought into pressure contact with the shaft, and the shaft and the vibrator can be linearly moved relative to each other by vibration of the vibrator. An output portion protruded from one end of the shaft engages with the driven member to transmit the drive force of the vibration wave motor to the driven member.

However, in the configuration disclosed in Japanese Patent Application Laid-Open No. 2005-312264, positions between the connecting pin which is the fulcrum and the working point in the pressurizing direction are separated. When the vibrator is vibrated in this state to drive the vibration wave motor so that a load is applied to the output portion, a rotational moment around the fulcrum is exerted. This rotational moment may cause variations in the pressure force applied to pressurize the protrusion of the vibrator into contact with the contact member.

Further, since directions of thus generated rotational moment invert to each other in each of cases that the vibrator is vibrated and drives in one direction of the linear relative movement and that the vibrator is vibrated and drives in the other direction, the increase and decrease of the pressurizing pressure can be caused by the direction of the relative movement. In general, the pressure force in the vibration wave motor affects the speed, driving efficiency, and quietness, and the variation of the pressure force as described above may reduce the driving characteristics of the vibration wave motor.

SUMMARY OF THE INVENTION

An aspect of the present disclosure is derived for the above mentioned object to provide a vibration type actuator capable of suppressing deterioration in drive characteristics.

A vibration type actuator comprises a drive member including a vibrator having an electro-mechanical energy conversion element and an elastic member to which the electro-mechanical energy conversion element is attached, a holding member configured to hold the vibrator, a guide member configured to guide the vibrator and the holding member in a first direction, a contact member in contact with the vibrator, and a pressure member configured to pressurize the vibrator and the contact member in a second direction intersecting the first direction, wherein the holding member includes an engaging portion engaging with the guide member to be rotatable around, as an axis, a third direction intersecting the first direction and the second direction, and an output portion configured to transmit a power generated by a drive of the drive member, and the output portion is located on a side of the vibrator with respect to a bottom surface of the holding member.

Further features of the present invention will become apparent from the following description of exemplary embodiments with reference to the attached drawings.

DESCRIPTION OF THE EMBODIMENTS

Figure 1:
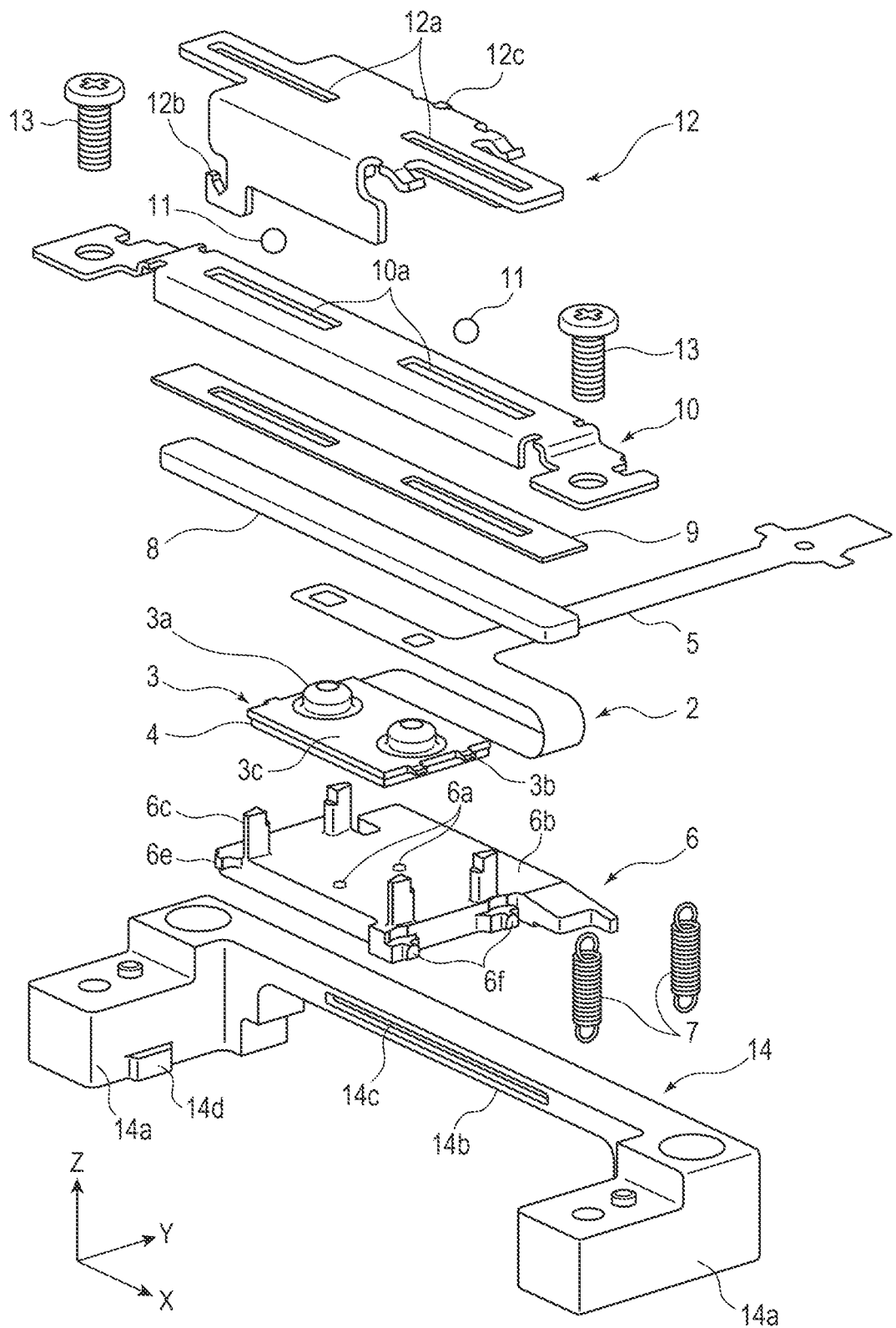
FIG. 1 is an exploded perspective view of an example of a vibration wave motor according to the first embodiment.

Exemplary embodiments for carrying out the present disclosure will now be described in detail with reference to the drawings. However, the dimensions, materials, shapes, relative positions of the components, etc., described in the following embodiments are optional and may be varied depending on the configuration of the apparatus to which the present disclosure is applied or various conditions. In the drawings, the same reference numerals are used to indicate elements that are identical or functionally similar.

First Embodiment

Figure 2A:
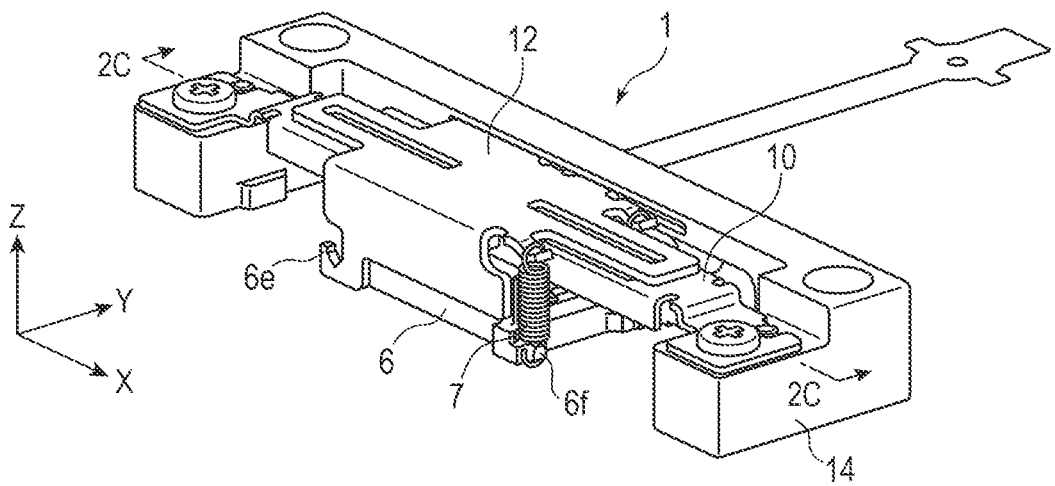
FIGS. 2A, 2B, 2C and 2D show an example of the vibration wave motor according to the first embodiment.
Figure 2B:
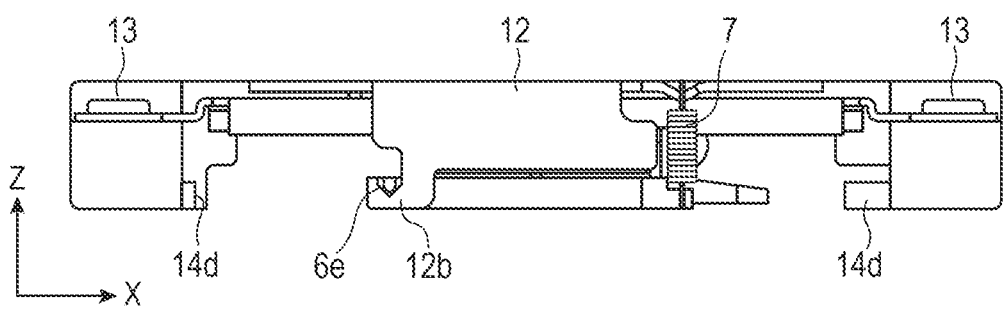
Figure 2C:
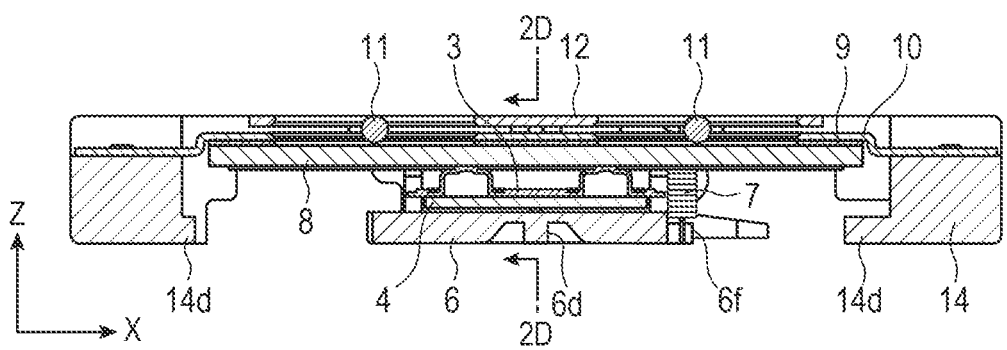
Figure 2D:
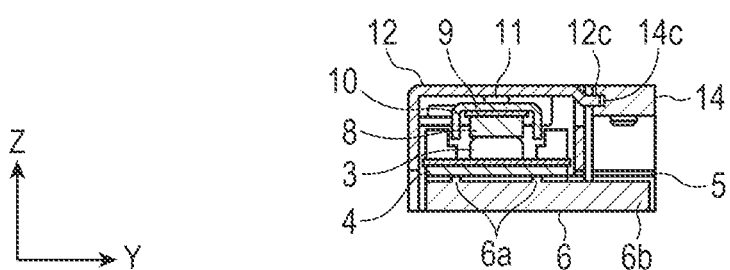

As a first embodiment of the present disclosure, an example in which the present disclosure is applied to a vibration wave motor which is used as a linear type vibration wave drive apparatus and is an example of a vibration type actuator will be described. A vibration wave motor according to present embodiment will be described below with reference to FIGS. 1 to 6B. First, the details of the vibration wave motor will be described with reference to FIGS. 1 to 2D. FIG. 1 is an exploded perspective view of a vibration wave motor 1 according to present embodiment, and FIGS. 2A to 2D are assembly views of the vibration wave motor 1. Specifically, FIG. 2A is a perspective view of the vibration wave motor 1, and FIG. 2B is an XZ plan view of the vibration wave motor 1. FIG. 2C is an XZ sectional view along a line 2C-2C of the vibration wave motor 1 in FIG. 2A, and FIG. 2D is a YZ sectional view along a line 2D-2D of the vibration wave motor 1 in FIG. 2C. Here, a relative moving direction of the vibrator 2 is defined as a X direction, a pressing direction as a Z direction, and a direction orthogonal to the X direction and the Z direction as a Y direction. In the present specification, an upper direction and a lower direction correspond to an upper direction and a lower direction in the Z direction, respectively.

The vibration wave motor 1 is provided with an elastic member 3, a piezoelectric element 4, a flexible printed circuit board 5, a holding member 6, a pressure spring 7, a contact member 8, a rubber 9, a first guide member 10, a second guide member 12, a screw 13, and a base 14. The contact member 8 is fixed to the first guide member 10 by the suction force of the rubber 9. The term "contact member" refers to a member that is in contact with the vibrator and moves relative to the vibrator by a vibration generated in the vibrator. A contact between the contact member and the vibrator is not limited to direct contact in which no other member is interposed between the contact member and the vibrator. The contact between the contact member and the vibrator may be an indirect contact in which other member is interposed between the contact member and the vibrator if the contact member is moved relative to the vibrator by the vibration generated in the vibrator. The term "other member" is not limited to a member independent from the contact member and the vibrator (for example, a high friction material made of a sintered member). The "other member" may be a surface treated portion formed on the contact member or the vibrator by plating, nitriding, or the like. The elastic member 3 is provided with a rectangularly shaped (flat plate-shaped) main part 3c and a plurality of (in the example of the drawing, 2×2 positions=4) extension parts 3b respectively extending from a plurality of positions (in the drawing, there are two places) in the X direction of the main part 3c. The plurality of extension parts 3b protrude from a plurality of positions (in the drawing, there are four places) different from each other in the X direction and the Y direction of the main part 3c.

A piezoelectric element 4 which is an electro-mechanical energy conversion element is fixed to the elastic member 3 with an adhesive or the like. The flexible printed circuit board 5 is fixed to an opposite surface opposite the surface to which the elastic member 3 is fixed, of the piezoelectric element 4. The vibrator 2 is composed of the elastic member 3 and the piezoelectric element 4. The vibrator 2 is provided with a flexible printed circuit board 5. The fixing method of the piezoelectric element 4 and the flexible printed circuit board 5 can be carried out by using an anisotropic conductive paste or an anisotropic conductive film capable of carrying electric power supply only in the Z direction.

As the material of the elastic member 3, a material having small damping characteristic of the vibration such as metal or ceramics can be used. In a manufacturing of the elastic member 3, a protrusion 3a may be integrally provided by press molding or cutting, or the protrusion 3a may be separately manufactured and fixed to the elastic member 3 later by welding or adhesion. Further, a plurality of protrusions 3a may be provided as in the present embodiment, or only one protrusion 3a may be provided.

The piezoelectric element 4 can be constituted by using lead zirconate titanate. The piezoelectric element 4 may be a piezoelectric material containing no lead such as barium titanate or sodium bismuth titanate as a main component. Electrode patterns (not shown) are formed on both surfaces of the piezoelectric element 4, and power is supplied from the flexible printed circuit board 5 using the electrode patterns.

Here, a pressurizing mechanism according to present embodiment will be described. A holding member 6 for pressurizing and holding the vibrator 2 is provided below the vibrator 2, and a second guide member 12 is provided above the vibrator 2. Two pressure support points 6e provided at one end in the X direction of the holding member 6 and two fitting portions 12b provided at the second guide member 12 are rotatably fitted around the Y axis direction. A pressure spring 7 is provided between the spring installation portion 6f provided at the other end of the holding member 6 in the X direction and the second guide member 12. The pressure spring 7 is an extension coil spring. Two protrusions 6a are provided on the holding member 6 at substantially central positions in the X direction between the pressure support point 6e and the pressure spring 7 (spring installation portion 6f), and these two protrusions 6a provided on the surface side of the holding member 6 are in contact with the vibrator 2 at their top portions.

As described above, in the pressurizing mechanism according to the present embodiment, the pressure force is applied to the vibrator 2 in the Z direction by the principle of a lever, where the pressure support point 6e is a fulcrum, the spring installation portion 6f is an effort point, and protrusion 6a is a working point. Further, a contact member 8 is provided above the vibrator 2, and is brought into pressure contact with the protrusion 3a of the elastic member 3 in the Z direction by the pressure applied to the vibrator 2 by the pressurizing mechanism. With such a pressurizing mechanism, the vibrator 2, the holding member 6, and the second guide member 12 can be moved integrally in the X direction (first direction) with respect to the contact member 8 as a driving member in present embodiment.

An output portion 6d is provided on a surface of the holding member 6 opposite to the protrusion 6a. In present embodiment, a recess having a predetermined depth in the vibrator direction is provided in a bottom surface 6h of the holding member 6, and a protrusion portion is provided so as to protrude from the recess bottom surface in the bottom surface 6h direction of the holding member 6. The protrusion portion is gripped by a first gripping member 15 and a second gripping member 16 (see FIG. 5), which will be described later, and acts as an output unit that provides a drive force to the gripping members at the gripped point. That is, the gripped point acts as an output point 6g which actually applies the drive force to the gripping member in an output portion 6d. The vibration wave motor 1 can output the drive force generated by the movement of the vibrator 2 to the outside by the output portion 6d of the holding member 6. In the present embodiment, a pressure support point 6e is provided at one end of the holding member 6 in the X direction, and the spring installation portion 6f is provided at the other end portion. However, these structures are not limited to those provided at the ends of the holding member 6 in the X direction, and each of them may be provided at a position capable of functioning as the fulcrum and the effort point of this principle with protrusion 6a as the working point. The flexible printed circuit board 5 can be fixed to the flexible base 6b of the holding member 6 with double-sided tape or the like.

The rubber 9, the first guide member 10 and the second guide member 12 are provided above the contact member 8. The contact member 8 is fixed to the first guide member 10 by the suction force of the rubber 9. The rubber 9 also carries a role of vibration damping which makes it difficult to transmit the vibration from the vibrator 2 to the first guide member 10. The first guide member 10 is fixed to the base 14, which is a fixing member, by screws 13. The fixing method of the contact member 8, the first guide member 10, and the rubber 9 may be adhesive or screw fastening. The contact member 8 may be formed of a metal, ceramic, resin or a composite material thereof having high wear resistance. In particular, a material obtained by nitriding stainless steel such as SUS420J2 can be used as the material of the contact member 8 from the viewpoint of abrasion resistance and mass productivity.

Next, a linear guide mechanism according to present embodiment will be described. The first guide member 10 is provided with a rolling groove 10a, the second guide member 12 is provided with a rolling groove 12a, and rolling grooves 10a, 12a sandwich two balls 11. Thus, when the vibration wave motor 1 is driven, the ball 11 rolls in the rolling grooves 10a, 12a, so that the vibrator 2, the holding member 6, and the second guide member 12 can move smoothly in the X direction. For the materials of the first guide member 10 and the second guide member 12, hardness is required because they are pressurized in the rolling grooves 10a and 12a, respectively, and a metal, especially stainless steel, can be used from the viewpoint of workability.

The base 14 is provided with two fixing portions 14a provided with a screw hole used for fixing the first guide member 10, a retaining portion, a hole used for fixing the base 14 to the outside component, and the like, a connecting portion 14b used for connecting them, a groove portion 14c, and a collision preventing portion 14d. The groove portion 14c is formed along the X direction in a part of the connecting portion 14b. The groove portion 14c and an inclination regulating portion 12c provided on the second guide member 12 are loosely fitted, that is, fitted in a state having a predetermined idle state, whereby the rotation of the vibrator 2 and the like about the X-axis can be regulated. The collision preventing portion 14d extends from the fixing portion 14a toward the holding member 6 in the X direction, and can prevent the pressure support point 6e of the holding member 6 and the spring installation portion 6f from colliding with the fixing portion 14a as the holding member 6 moves. The base 14 may be formed of a resin from the viewpoint of processability and slidability.

The flexible printed circuit board 5 is fixed to the fixing portion 14a. Therefore, the base 14 also has a function of accommodating the curved portion of the flexible printed circuit board 5 which moves while being curved with the movement of the vibrator 2 and the holding member 6.

Figure 3A:
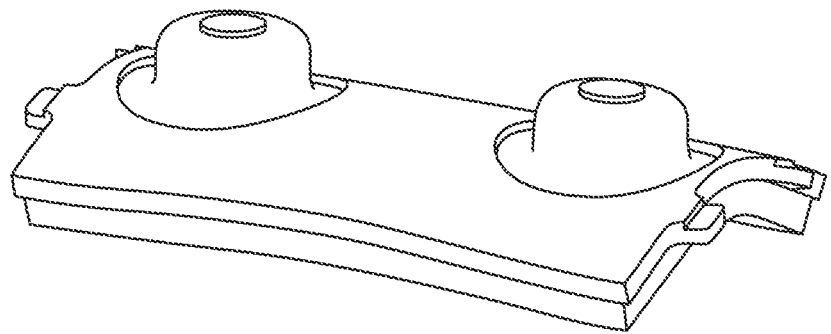
FIGS. 3A and 3B are diagrams for explaining examples of vibration modes according to the first embodiment.
Figure 3B:
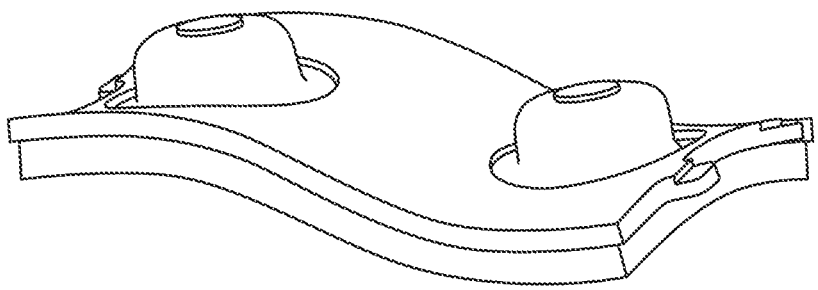

Next, a vibration mode excited by the vibrator 2 will be described with reference to FIGS. 3A and 3B. In present embodiment, an AC voltage is applied to the piezoelectric element 4 through the flexible printed circuit board 5 to excite standing waves (out-of-plane bending vibrations) different in phase from each other to the vibrator 2, thereby generating vibrations obtained by combining these out-of-plane bending vibrations. FIG. 3A shows the vibrator 2 driven in mode A, which is a first vibration mode, and FIG. 3B shows the vibrator 2 driven in mode B, which is a second vibration mode. In FIG. 3A and FIG. 3B, the flexible printed circuit board 5 is omitted to show the vibrator 2 in order to simplify the description.

The mode A as the first vibration mode is a primary out-of-plane bending vibration mode in which two nodes appear in parallel to the X direction, which is the longitudinal direction of the vibrator 2. The two protrusions 3a are displaced in the Z direction, which is the pressing direction, by the vibration of the mode A. The mode B as the second vibration mode is a secondary out-of-plane bending vibration mode in which three nodes substantially parallel to the Y direction, which is the shorter direction of the vibrator 2, appear. The two protrusions 3a are displaced in the X direction by the vibration of the mode B.

By combining the vibrations of the mode A and the mode B, the two protrusions 3a perform elliptical or circular motion in the XZ plane. When the contact member 8 is brought into pressure contact with the protrusions 3a, a frictional force is generated in the X direction, and a drive force (thrust) for relatively moving the vibrator 2 and the contact member 8 is generated. In present embodiment, since the contact member 8 is fixed to the base 14 as described above, the vibrator 2 moves in the X direction.

In order to efficiently drive the vibration wave motor 1, it is necessary to support the vibrator 2 without inhibiting the vibration (displacement) of the two vibration modes excited on the vibrator 2, and for this purpose, it is desirable to support the vibrator 2 in the vicinity of the nodes of the two vibration modes. For this reason, two protrusion portions 6a are provided on the holding member 6 in order to pressurize and hold the common node of the two vibration modes excited on the vibrator 2. Further, by positioning the vibrator 2 by the retaining portion 6c provided on the holding member 6, the two protrusions 6a can be brought into contact with the vibrator 2 in the vicinity of the nodes of the two vibration modes, respectively.

Furthermore, protrusion 6a not only pressurizes the vibrator 2 but also holds the vibrator 2 in the X and Y directions by frictional force. In present embodiment, since the maximum value of the static frictional force between protrusion 6a and the vibrator 2 is always larger than the reaction force received by the vibrator 2 from the contact member 8 when the vibrator 2 is driven, the vibrator 2 does not move with respect to the holding member 6. Thus, precise driving can be performed.

In present embodiment, a notch as shown in FIG. 2D is provided above the retaining portion 6c. For example, when the vibration wave motor 1 is subjected to a strong force such as a drop impact, the notched portion and the first guide member 10 collide with each other, thereby preventing the ball 11 from coming off the respective rolling grooves. As described above, the retaining portion 6c also serves as a stopper for position change when an overload occurs on the first guide member 10.

Figure 4A:
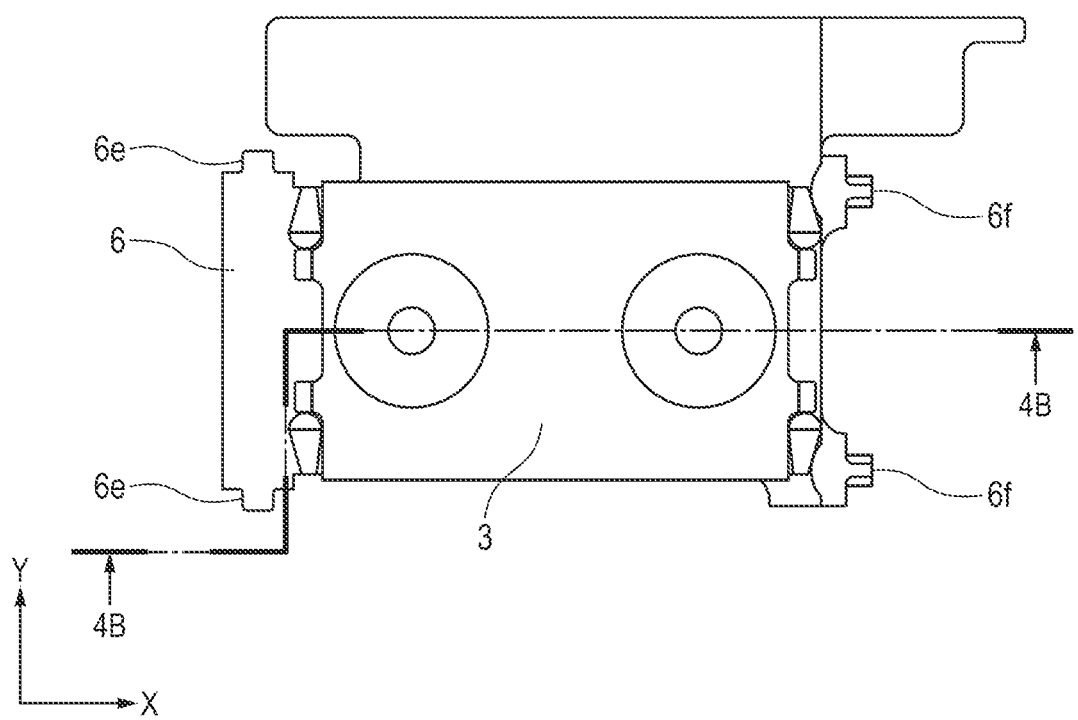
FIGS. 4A and 4B are views for explaining an example of a force relationship generated by a pressure member in the vibration wave motor according to the first embodiment.
Figure 4B:
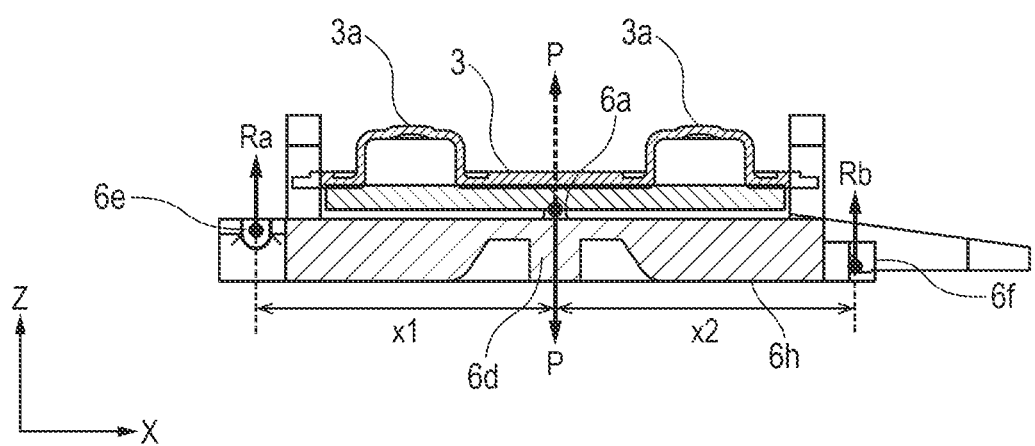

Next, the pressurizing mechanism according to present embodiment will be described in more detail with reference to FIGS. 4A and 4B. FIG. 4A is an XY plan view showing only the vibrator 2 and the holding member 6, and FIG. 4B is a sectional view of these members along a line 4B-4B in FIG. 4A. In FIG. 4B, the Y direction position of the line 4B-4B is shifted in the middle in order to clearly illustrate the positional relationship between the output portion 6d, the pressure support point 6e and the spring installation portion 6f in the XZ plane. FIG. 4B also shows forces in the Z direction applied to the output portion 6d, the pressure support point 6e, and the spring installation portion 6f It is assumed that the position of the output portion 6d in the X direction substantially coincides with the position of protrusion 6a in contact with the vibrator 2 in the X direction.

The upward force of Rb in the Z direction is generated in the spring installation portion 6f by the force of the pressure spring 7. Here, as described above, the pressure support point 6e is free to rotate about the Y axis with respect to the fitting portion 12b, and other displacements are restricted. Therefore, assuming that a distance in the X direction from the pressure support point 6e to the protrusion 6a is x1 and a distance in the X direction from protrusion 6a to the spring installation portion 6f is x2, a rotational moment Rb×(x1+x2) about the pressure support point 6e is generated by the pressure spring 7. Assuming that x1 and x2 are equal, the protrusion 6a is subjected to a downward force of 2Rb in the Z direction by the following moment balance equation (1). In other words, the vibrator 2 is pressurized against the contact member 8 by a force of 2Rb. This is the pressurization when the vibration wave motor 1 is stationary.

$$P \times x1 = Rb \times (x1+x2)$$

x1=x2, therefore $$P=2Rb \quad \text{Equation (1)}$$

Figure 5:
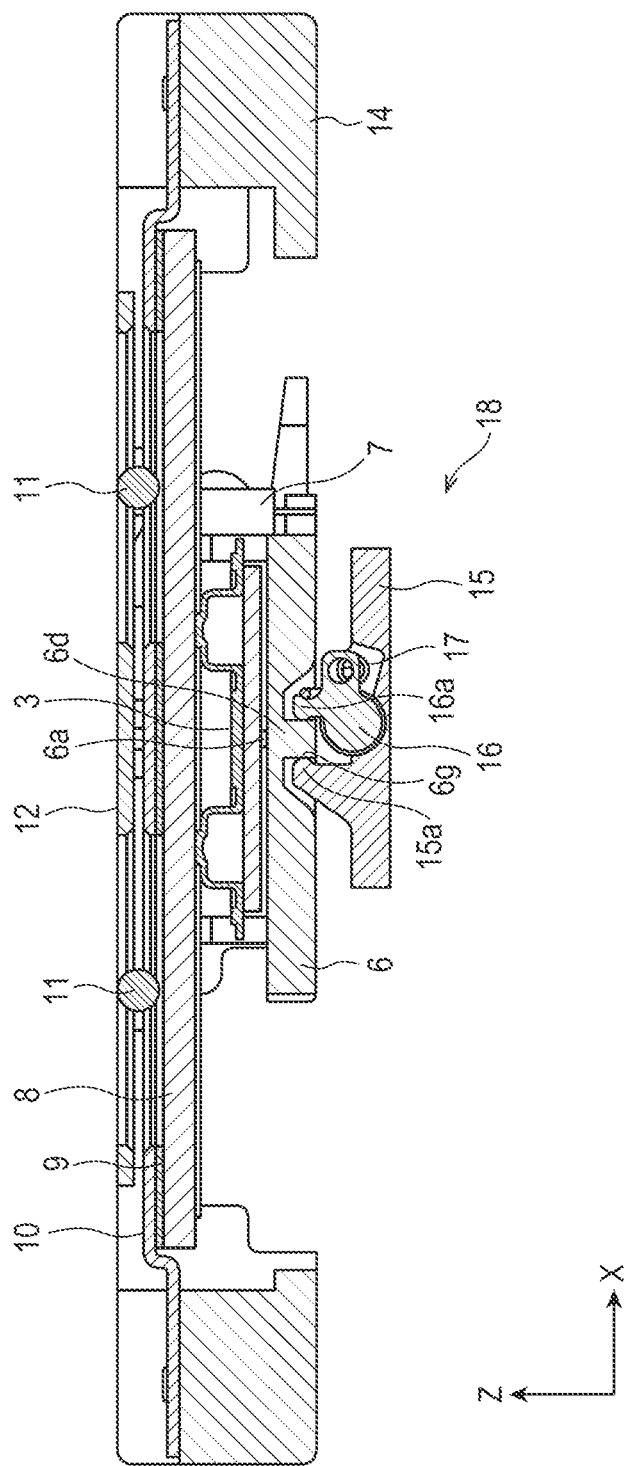
FIG. 5 is an XZ sectional view of an example of the vibration wave motor and an output transmission portion according to the first embodiment.

Next, an output transmission mechanism according to present embodiment will be described with reference to FIG. 5. FIG. 5 is an XZ sectional view of the vibration wave motor 1 and the output transmission portion 18 according to the present embodiment. The output transmission portion 18 of the present embodiment connected to a driven member includes a first gripping member 15, a second gripping member 16, and a torsion spring 17. A first gripping portion 15a of the first gripping member 15 and a second gripping portion 16a of the second gripping member 16 grip the output portion 6d. The second gripping member 16 is rotatably fitted around the Y-axis to the first gripping member 15, and a gripping force is applied around the Y-axis while being rattled by a predetermined force in the Y-axis direction by a torsion spring 17.

Since the gripping force is larger than the thrust force generated by the vibration wave motor 1, the driven member can be precisely driven without causing a rattle between the vibration wave motor 1 and the driven member connected to the output transmission portion 18. Further, since the output portion 6d is gripped in the X direction, which is the traveling direction, stable driving can be performed without affecting the pressure applied to the vibrator 2. In present embodiment, the thrust generated by the vibration wave motor 1 is transmitted to the driven member through the output transmission portion 18 at the gripped point where the gripping members 15, 16 grip the output portion 6d.

Figure 6A:
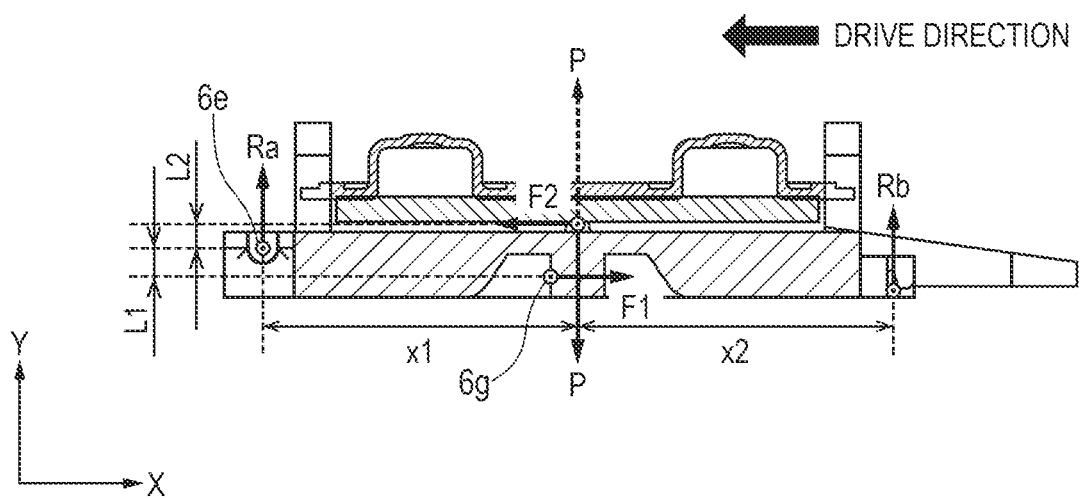
FIGS. 6A and 6B are diagrams for explaining an example of the relationship of forces generated when the vibration wave motor according to the first embodiment is driven.
Figure 6B:
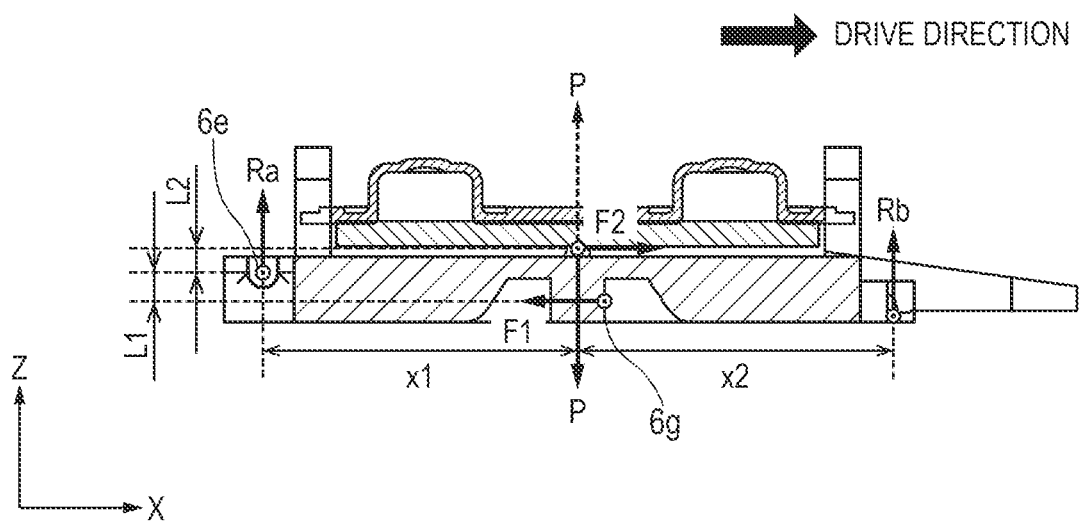

The drive force generated by the vibrator 2 is transmitted to the contact member 8 through the protrusion 6a so as to act in the X direction. Next, with reference to FIGS. 6A and 6B, a force acting on the vibrator 2 and the holding member 6 when the vibration wave motor 1 is operated will be described. FIGS. 6A and 6B show the force acting on the vibrator 2 and the holding member 6 in the same manner as FIG. 4B, FIG. 6A shows a case where the vibrator 2 moves in a direction toward the left side of the drawing, and FIG. 6B shows a case where the vibrator 2 moves in a direction toward the right side of the drawing.

When the vibration wave motor 1 is driven, the protrusion 6a receives the force of F2 in the X direction from the vibrator 2. The output portion 6d receives a force from the output transmission portion 18, which has the same value as that of the force generated by vibrator and acts in a direction opposite to that of the force generated by the vibrator 2, at the gripping point of the output transmission portion 18. As shown in FIG. 6A, when the vibration moves to the left side on the drawing, the protrusion 6a receives the force of F2 toward the left side in the X direction, and the output portion 6d receives the force of F1 toward the right side in the X direction from the output transmission portion 18 (−F2=F1). Assuming that a distances in the Z direction of the points where F1 and F2 are generated from the pressure support point 6e are L1 and L2, respectively, the following equation of moment balance is established. The signs of the respective parameters are defined as a positive value of the force toward the right side in the X direction and a positive value of the force toward the upper side in the Z direction with the pressure support point 6e as the center.

$$P \times x1 = Rb \times (x1+x2) + F1 \times L1 + F2 \times L2$$

$$P = Rb \times (x1+x2)/x1 + (F1 \times L1 + F2 \times L2)/x1$$

where −F2=F1, and therefore $$P = Rb \times (x1+x2)/x1 + (L1-L2)F1/x1$$

In a case that x1=x2, $$P=2Rb+(L1-L2)F1/x1 \quad \text{Equation (2)}$$

From the equation (2), the apply pressure P applied to the vibrator 2 varies by (L1−L2)F1/x1 minute. That is, the larger distances L1 and L2 or the smaller x1, the greater the variation of the apply pressure P. If the driving direction is reversed as shown in FIG. 6B from the case shown in FIG. 6A, the sign of F1 is reversed, so that the sign of the pressure variation portion is also reversed. For example, when the vibration moves toward the left side of the drawing as shown in FIG. 6A, since F1 takes a negative value, (L1−L2)F1/x1 becomes a positive value, and the apply pressure P increases more than at rest. On the other hand, when the vibration moves toward the right side of the drawing as shown in FIG. 6B, since F1 becomes a negative value, (L1−L2)F1/x1 becomes a positive value, and the apply pressure P decreases.

Generally, when the pressure force increases in the vibration wave motor, the driving speed decreases and the driving efficiency tends to deteriorate. On the other hand, when the pressure force is small, the driving speed increases and the driving efficiency is improved, but there is a demerit that abnormal noise is easily generated. Further, when the speed differs depending on the moving direction, there is a concern that the controllability is affected. Therefore, in the vibration wave motor, it is necessary to keep the variation of the apply pressure within a certain value.

In the conventional vibration wave motor, the holding member has a substantially flat plate shape, and the output portion is located so as to protrude from the bottom surface of the flat plate shape. On the other hand, the pressure support point 6e is often provided on a side surface of a substantially flat plate shape. Therefore, the value of L1 relative to L2 is very large, and the variation of the apply pressure P cannot be ignored in performing a precise operation. In the present embodiment, in consideration of the above described equation (2), one of the purposes of the present disclosure is to reduce as much as possible the variation of the pressurizing force in the driving direction. Specifically, a point (output point 6g) at which the force F1, which is the actual driving force, is obtained from the output portion 6d is provided inside the holding member 6, that is, above the surface opposite to the vibrator 2 (the bottom surface of the holding member 6) in the Z direction in drawing. This makes it possible to make L1 sufficiently small and at least close to L2 as compared with a conventional vibration wave motor.

It should be noted that, ideally, it is desirable that the above mentioned variation is made zero, but in practice, the positional relationship among the protrusion 6a, the output portion 6d, the pressure support point 6e, and the spring installation portion 6f is subject to design constraints, material constraints of the holding member 6, and the like. Therefore, it is desirable to set the variation to a certain value or less, and to configure the holding member 6 under conditions that satisfy this. In other words, in order to keep the apply pressure within the proper range, it is preferable to set each parameter to satisfy the following equation. According to equation (3), the absolute value of the term of the pressure variation at the time of driving can be set to 10% or less of the apply pressure at the time of standstill, so that precise driving control suitable for practical use at present can be performed.

$$0.1 \times (2Rb \times x2/x1) > |(L1-L2)F1/x1| \qquad \text{Equation (3)}$$

As described above, the vibration wave motor 1, which is an example of the vibration type actuator according to the present embodiment, transmits a drive force to the driven member through the gripped point gripped by the gripping member provided on the output transmission portion 18 of the driven member. The vibration wave motor 1 is provided with the drive member having the vibrator 2, the holding member 6, and the guide member (12), a contact member 8 in contact with the vibrator 2, and a pressure member (7). The driving member has the electro-mechanical energy conversion element (4) for converting the electric energy into mechanical energy, and the elastic member 3 to which the conversion element (4) is fixed. In present embodiment, the piezoelectric element 4 is used as an example of the electro-mechanical energy conversion element. The holding member 6 holds the vibrator 2, and a second guide member 12 as an example of the guide member guides the vibrator 2 and the holding member 6 in the first direction. In present embodiment, the first direction corresponds to, for example, the X direction in FIG. 1. In the present embodiment, the pressure spring 7 is used as an example of the pressure member, and the pressure spring 7 pressurizes the vibrator 2 and the contact member 8 in the second direction intersecting the first direction. In present embodiment, the second direction corresponds to, for example, the Z direction in FIG. 1.

The holding member 6 is provided with the pressure support point 6e as an engaging portion engaging with the second guide member 12. The pressure support point 6e is engaged with the second guide member 12 so as to be rotatable around a third direction as an axis intersecting the first direction and the second direction. In present embodiment, the third direction corresponds to the Y direction intersecting the X direction and the Z direction. In present embodiment, it is assumed that the first to third directions are orthogonal to each other. However, the present embodiment also includes a case where the state deviates from the exact orthogonal state in response to an assembly error or a request for compactification, for example. The holding member 6 includes an output portion 6d provided with an output point 6g (corresponding to the above described gripping point) for transmitting the power generated by a drive of the driving member to the driven member. In present embodiment, the output portion 6d is located closer to the vibrator than the bottom surface 6h of the holding member 6, and the output point 6g can be located closer to the vibrator than the bottom surface 6h of the holding member 6 by disposing the output portion 6d in this manner in the holding member 6.

In the above described vibration wave motor 1, the holding member 6 supports the vibrator 2 on the front surface side through the protrusion 6a or the like, and has the flat plate portion where the output point 6g is arranged on the rear surface side. The output portion 6d is provided so as to protrude toward the recess opening from the bottom surface of the recess provided toward the surface side from the bottom surface 6h of the holding member 6 in the flat plate portion. The output point 6g is provided at a position corresponding to a position (a gripped point) at which a gripping member (15, 16) included in the driven member grips the output portion 6d in the recess.

In the vibration wave motor 1 described above, the axis of the engaging portion (6e) acts as the fulcrum, the point (6f) at which the pressure force from the pressure member (7) acts on the holding member 6 acts as the effort point, and the point at which the holding member 6 presses the vibrator 2 toward the contact member 8 acts as the working point. Here, the distance in the X direction from the fulcrum to the working point is represented by x1, the distance in the X direction from the fulcrum to the effort point is represented by x1+x2, the distance in the Z direction from the fulcrum to the output point is represented by L1, and the distance in the Z direction from the fulcrum to the working point is represented by L2. The pressure force applied to the effort point by the pressurizing member (7) is represented by Ra, the thrust generated by the vibrator 2 is represented by F1, and the pressure force applied to the vibrator 2 at the working point is represented by P. In this case, these variables desirably satisfy the condition shown by the equation of $$0.1 \times (2Rb \times x2/x1) > |(L2-L1)F1/x1|$$

By satisfying this condition, the variation of the apply pressure from the vibrator 2 to the contact member 8 in the drive direction can be suppressed to such a degree that the stopping accuracy of the vibration wave motor required at present can be satisfied.

In the above described vibration wave motor 1, two different standing waves generated in the vibrator 2 are combined to relatively move the drive member and the contact member 8. At this time, the vibrator 2 can be pressurized in the direction of the contact member 8 at a common node position of two different standing waves in the vibrator 2 by two protrusions (6a) provided on the holding member 6. The output point may be located at a position substantially overlapping the two protrusions (6a) in the X direction. Further, the output point can be located at a substantially central position of the two protrusions (6a) in the Y direction.

With the above described configuration, in the present embodiment, the output point 6g can be provided inside the holding member 6 of the vibration wave motor 1. By adopting such a structure, it is possible to suppress the variation of the apply pressure from the vibrator 2 to the contact member 8 in the drive direction, and to suitably reduce the change in the drive characteristics of the vibration wave motor 1.

In the linear type vibration wave motor of the present disclosure, the method of generating elliptical motion or circular motion on the contact surface is not limited to the above described method. For example, vibrations of the bending vibration modes different from those as described above may be combined, or vibrations of a longitudinal vibration mode for elongating and contracting the elastic member 3 in the longitudinal direction may be combined with vibrations of the bending vibration mode. Any drive method may be used, as long as having a common node for the pressurization and holding, in which elliptical motion and circular motion are generated on the contact surface by a combination of a vibration mode for displacing the contact surface of the contact member 8 in the drive direction and a vibration mode for displacing the contact surface in the pressure direction.

Second Embodiment

In the first embodiment, in order to reduce the variation of the apply pressure P, only the output point of the drive force is focused, and the output point is arranged nearer the side of the vibrator 2 than the side of the bottom surface of the holding member 6. On the other hand, the present embodiment shows an example of another configuration for reducing the variation in the apply pressure. In contrast to the vibration wave motor 1 exemplified in the first embodiment, the vibration wave motor according to the present embodiment has substantially the same structural elements as those in the first embodiment other than the holding member 26, and therefore a detailed description thereof will be omitted.

Figure 7A:
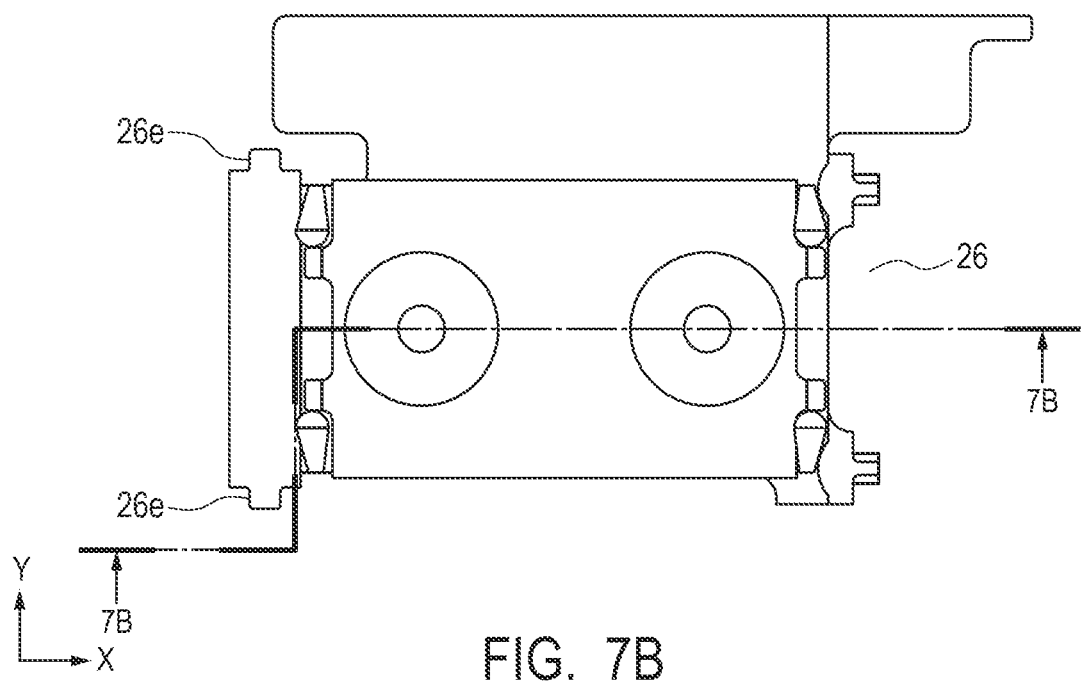
FIGS. 7A, 7B and 7C are diagrams for explaining an example of a vibration wave motor according to the second embodiment.
Figure 7B:
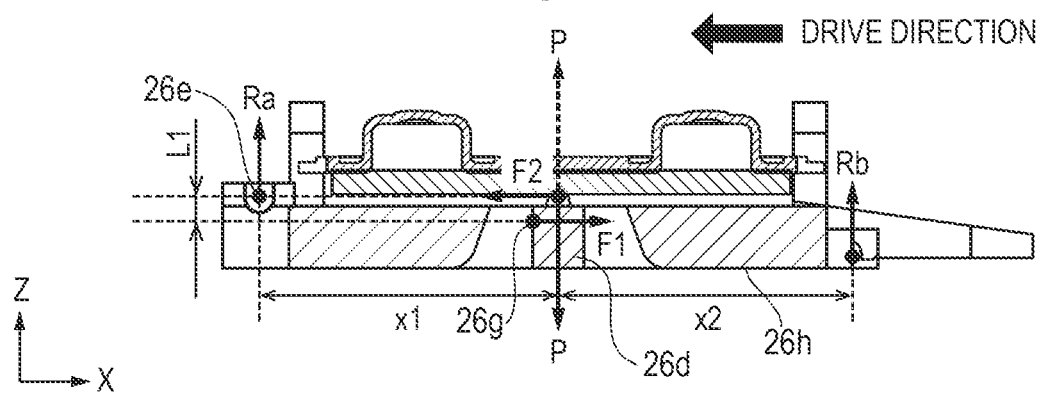
Figure 7C:
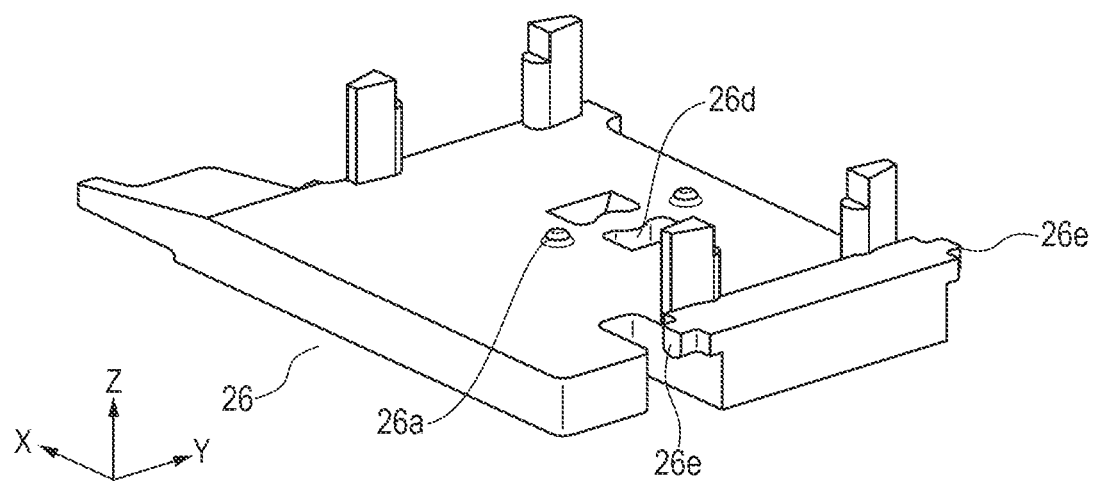

FIGS. 7A and 7B show the vibrator 2 and the holding member 26 according to the present embodiment in the same manner as FIGS. 4A and 4B. Specifically, FIG. 7A is an XY plan view of the vibrator 2 and the holding member 26 according to the present embodiment, and FIG. 7B is a sectional view taken along a line 7A-7A in FIG. 7A. FIG. 7C is a perspective view of the holding member 26.

In the present embodiment, the position of the pressure support point 26e in the Z direction is made to coincide with the contact point (protrusion 26a) between the vibrator 2 and the holding member 26, that is, the point where F2 occurs. Specifically, in the flat plate arrangement of the pressure support point 6e in the first embodiment, a portion protruding from the flat plate portion toward a side on which the contact member 8 is located is provided, and the pressure support point 26e is provided at this position. Thus, the position of the pressure support point 26e and the position of the top of protrusion 26a can be arranged in the same XY plane. As a result, L2 can be set to substantially zero, and when L2=0 is substituted into the abovementioned equation (2), the apply pressure P becomes the following equation (4).

$$P = 2Rb + L1 \times F1/x1 \quad \text{Equation (4)}$$

Since the variation is $L1 \times F1/x1$, if L2 is simply set to 0, L1 becomes larger by that amount, and therefore the variation amount does not change. Therefore, the distance L1 in the Z direction between the contact point between the output portion 26d and the output transmission portion (not shown), that is, the output point of F1 and the pressure support point 6e, must also be reduced. In present embodiment, as shown in FIG. 7C, a hole penetrating from the bottom surface of the holding member 26 to the surface of the holding member 26 is provided around the output portion 26d. Using this hole, the grip member (not shown) can grip the output portion 26d at a position closer to the surface of the holding member 26 than that in the first embodiment. Thus, the position of the output point 26g on the output portion 26d can be closer to the vibrator 2, and the L1 is also made smaller.

As described above, in the vibration wave motor 1 according to the present embodiment, the holding member 26 has a flat plate portion for supporting the vibrator 2 on the surface side through protrusion 26a or the like. The output portion 26d is provided so as to be positioned inside the through hole provided in the flat plate portion toward the surface side from the bottom surface 26h of the holding member 26. In present embodiment, by using such a configuration, it is possible to arrange the output portion 26d closer to the vibrator than the bottom surface 26h of the holding member 26. The output point 26g is provided at a position corresponding to a position (gripped point) at which a gripping member (15, 16) of the driven member grips the output portion inside the through hole. By providing the gripped point inside the through hole, the output point 26g can be provided closer to the surface of the holding member 26, and the output point 26g can be located closer to protrusion 26a in the Z direction.

The engaging portion of the present embodiment is provided on the holding member 26 so as to protrude toward the side where the contact member 8 or the output portion 26d is located in the Z direction from a plane defined by the X direction, the Y direction, and the point (the top of protrusion 26a) at which the holding member 26 presses the vibrator 2 toward the contact member 8. By adopting such an arrangement, the distance L2 in the Z direction from the engaging portion (26e) to the point (protrusion 26a) at which the holding member 26 presses the vibrator 2 toward the contact member 8 can be made substantially zero. By arranging the output point 26g and the engaging portion (26e) as in the present embodiment, the L2 can be made substantially zero, and the L1 can be greatly reduced as compared with the conventional configuration. Therefore, it is possible to suppress the variation of the apply pressure from the vibrator 2 to the contact member 8 in the drive direction and to suitably reduce the change in the drive characteristics of the vibration wave motor 1.

Third Embodiment

In the above described first embodiment, the output portion 6d of the holding member 6 is provided in the recess formed from the bottom surface, and the output point of the drive force is made close to the vibrator. In the above described second embodiment, the output portion 26d of the holding member 26 is provided in the through hole penetrating from the bottom surface to the surface, and the output point of the drive force is made close to the vibrator. On the other hand, the present embodiment shows an example of a further configuration for reducing the variation in the pressurization. In contrast to the vibration wave motor 1 exemplified in the first embodiment, the vibration wave motor according to the present embodiment has substantially the same structural elements as those in the above described embodiments other than the holding member 36, and therefore a detailed description thereof will be omitted.

Figure 8A:
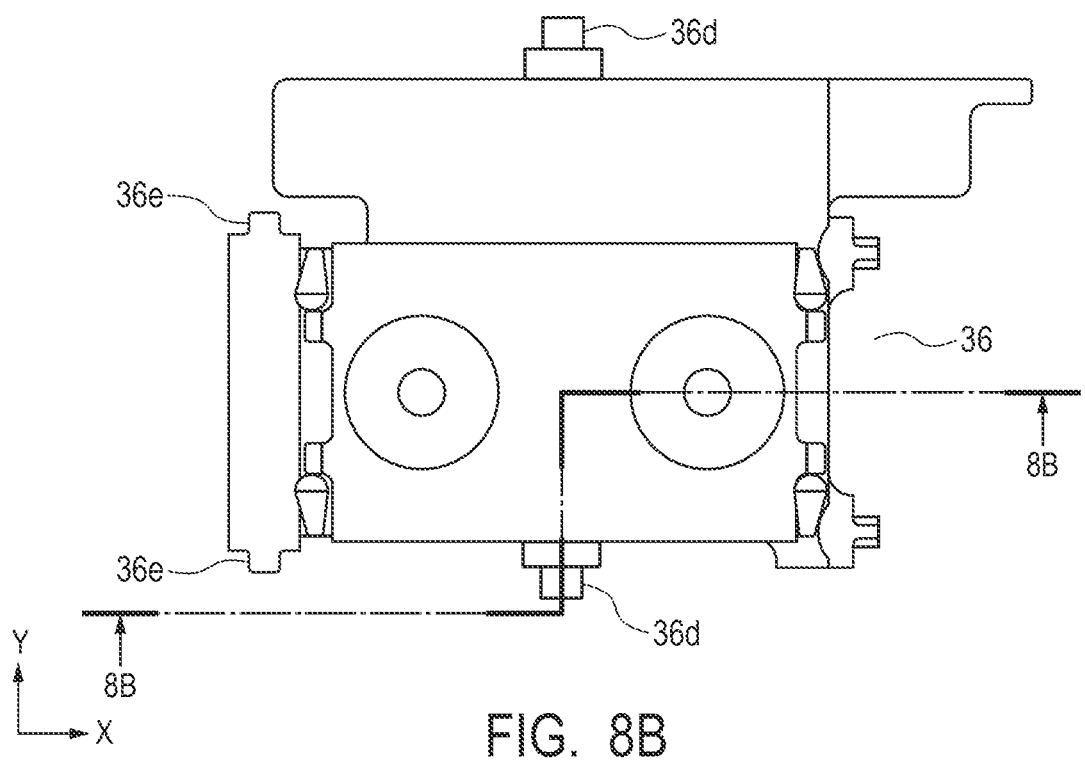
FIGS. 8A. 8B and 8C are diagrams for explaining an example of a vibration wave motor according to the third embodiment.
Figure 8B:
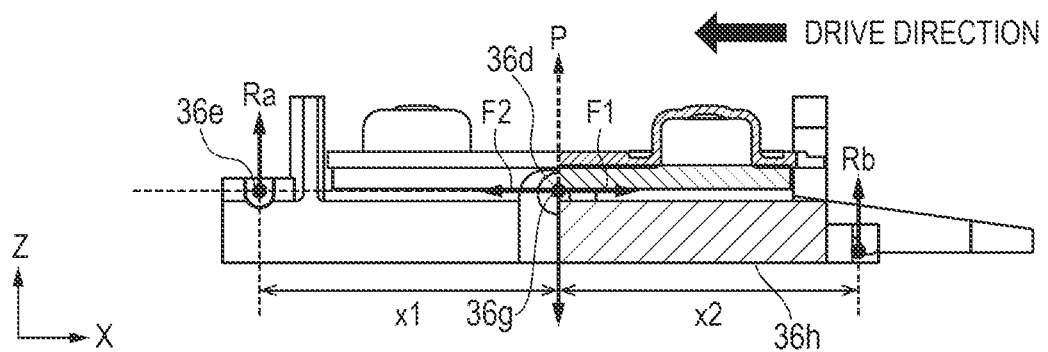
Figure 8C:
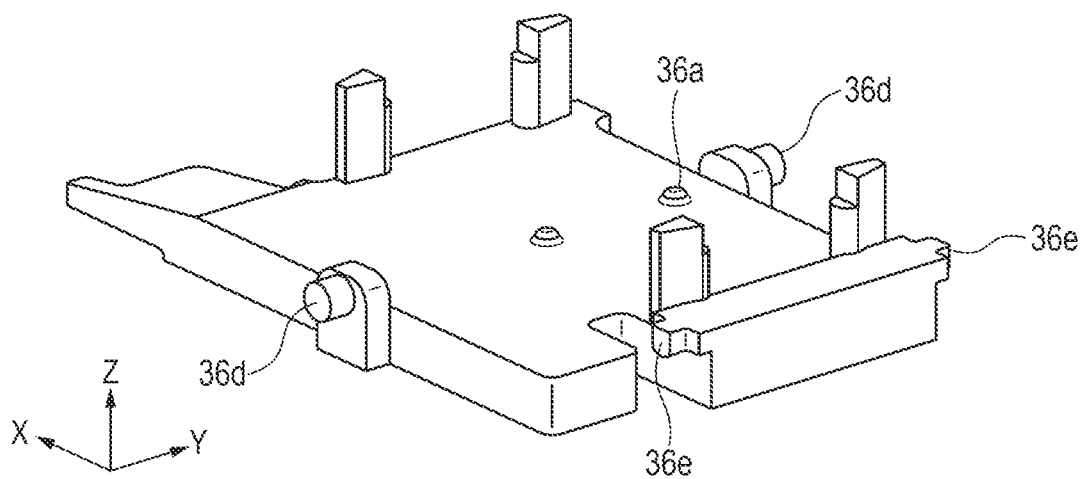

FIGS. 8A and 8B show the vibrator 2 and the holding member 36 according to the present embodiment in the same manner as FIGS. 4A and 4B. Specifically, FIG. 8A is an XY plan view of the vibrator 2 and the holding member 36 according to the present embodiment, and FIG. 8B is a sectional view taken along a line 8B-8B in FIG. 8A. FIG. 8C is a perspective view of the holding member 36.

In the present embodiment, the position of the pressure support point 36e in the Z direction is made to coincide with the contact point between the vibrator 2 and the holding member 26, that is, the point at which F2 occurs, as in the case of the second embodiment. In addition, in the present embodiment, the contact point between the output portion 36d and the output transmission portion (not shown), that is, the position of the output point of F1 and the pressure support point 36e in the Z direction are made to coincide with each other, and L1 is set to be substantially zero. Specifically, in place of the output portion 6d in the first embodiment, a portion protruding in the Y direction from the flat plate like portion where protrusion 36a and the like are located is provided, a portion protruding toward the contact member 8 side is provided at this Y direction protruding portion, and the output portion 36d is provided at thus provided position. The output portion 36d is not located on the side of the bottom surface 36h, but is located in this manner so that the output portion 36d can be located on the side of the contact member 8 rather than the surface of the holding member 36 while avoiding the contact member 8. In the configuration examples of the first embodiment and the second embodiment, for example, because of the thickness of the gripping portion of the gripping member in the Z direction, it is not easy for the output transmission portion to interfere with the vibrator 2 to make L1 zero. However, by extending the output portion 36d in the Y direction as in the present embodiment, the position in the Z direction of the contact point between the output portion 36d and the output transmission portion (not shown) can be made to coincide with the pressure support point 6e.

In the present embodiment, the output portions 36d are provided at two positions, and each of the portions is held by the output transmission portion so as not to generate a moment around the Z axis. Thus, L2 and L1 can be made substantially zero. When L1=0 and L2=0 are substituted into the above mentioned equation (2), the apply pressure P becomes the following equation (5).

$$P=2Rb \quad \text{Equation (5)}$$

That is, in the vibration wave motor according to the present embodiment, the variation with respect to the apply pressure P is substantially eliminated, and a constant apply pressure P can be obtained regardless of the drive direction of the drive member. According to the present embodiment, although the size in the Y direction increases and the number of parts increases, the variation of the pressure force can be suppressed to almost zero.

In the present embodiment, the output portion 36d is provided on the holding member 36 so as to protrude toward the side where the contact member 8 or the engaging portion (36e) exists in the Z axis direction from a plane defined by the X direction, the Y direction, and the point (the top of the protrusion 36a) at which the holding member 36 presses the vibrator 2 toward the contact member 8. By using such a configuration, the output portion 36d can be located closer to the vibrator than the bottom surface 36h of the holding member 36. The output point 36g is provided at a position corresponding to a position where the holding members (15, 16) of the driven member grip the output portion 36d at the protruded portion. The output point 36g is located at a position symmetrical to the substantially center of the two protrusions (36a) in the Y direction. With such a configuration, the output point 36g can be arranged closer to the contact member 8 than the surface of the holding member 36, and the distance L1 in the Z direction from the engaging portion (36e) to the output point 36g can be made substantially zero.

Therefore, it is possible to suppress the variation of the apply pressure from the vibrator 2 to the contact member 8 in the drive direction and to suitably reduce the change in the drive characteristics of the vibration wave motor 1.

Fourth Embodiment

Figure 9A:
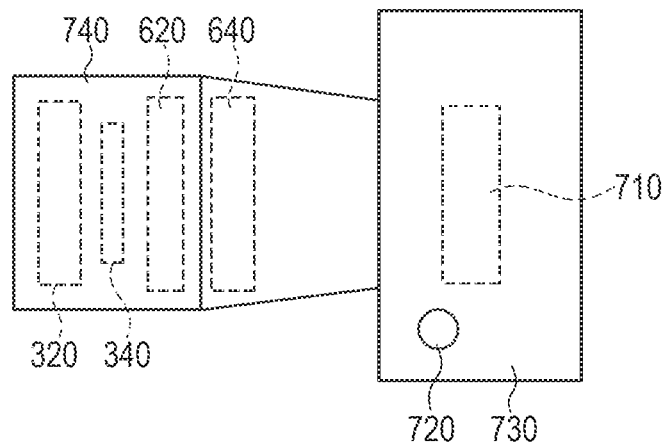
FIGS. 9A and 9B show an example of an imaging apparatus using a vibration wave motor, according to the fourth embodiment.
Figure 9B:
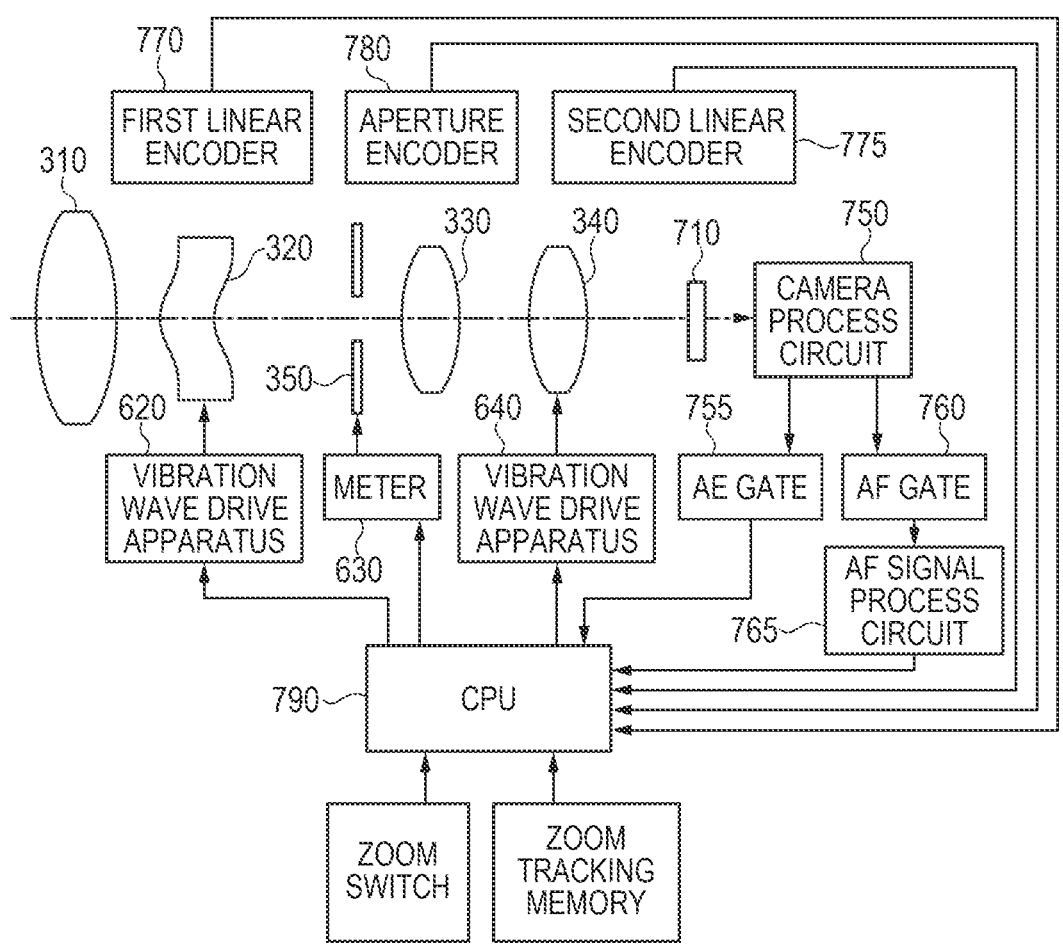

The vibration wave motor can be used, for example, in a lens driving application of an imaging apparatus (optical equipment and electronic equipment). With reference to FIGS. 9A and 9B, an example of an imaging apparatus using the vibration wave motor for driving a lens arranged in a lens barrel will be described as a fourth embodiment of the present disclosure.

FIG. 9A is a top view schematically showing the configuration of the imaging apparatus 700. The imaging apparatus 700 is provided with a camera body 730 mounted with an imaging element 710 and a power button 720. The imaging apparatus 700 is provided with a lens barrel 740 having a first lens group (not shown), a second lens group 320, a third lens group (not shown), a fourth lens group 340, and a vibration wave drive apparatus 620, 640. The lens barrel 740 can be replaced as an interchangeable lens, and the lens barrel 740 suitable for a photographing object can be attached to the camera body 730. In the imaging apparatus 700, the second lens group 320 is driven by the vibration wave drive apparatus 620 and the fourth lens group 340 is driven by the vibration wave drive apparatus 640.

The vibration wave drive apparatus 620 has a configuration similar to that of the vibration wave motor according to the first to the third embodiments.

In the vibration wave drive apparatus 620, the drive portion and the output transmission portion 18 of the vibration wave motor 1 are integrated with the second lens group 320 to move the second lens group 320 in the optical axis direction. The vibration wave drive apparatus 640 has the same structure as that of the vibration wave drive apparatus 620, so that the fourth lens group 340 is moved in the optical axis direction.

FIG. 9B is a block diagram showing a schematic configuration of the imaging apparatus 700. Inside the lens barrel 740, a first lens group 310, the second lens group 320, a third lens group 330, the fourth lens group 340 and a light amount adjusting unit 350 are arranged at predetermined positions on the optical axis. Light passing through the first lens group 310 to the fourth lens group 340 and the light amount adjusting unit 350 forms an image on the imaging element 710. The imaging element 710 converts an optical image into an electric signal and outputs the electric signal to the camera process circuit 750.

The camera process circuit 750 applies amplification, gamma correction, or the like to the output signal from the imaging element 710. The camera process circuit 750 is connected to the CPU 790 through the AE gate 755 and to the CPU 790 through the AF gate 760 and the AF signal process circuit 765. The image signal subjected to predetermined process in the camera process circuit 750 is sent to the CPU 790 through the AE gate 755, the AF gate 760 and the AF signal process circuit 765. The AF signal process circuit 765 extracts a high frequency component of the image signal, generates an evaluation value signal for autofocus (AF), and supplies the generated evaluation value to the CPU 790.

The CPU 790 is a control circuit for controlling the overall operation of the imaging apparatus 700, and generates control signals for determining exposure and focusing from the acquired image signals. The CPU 790 adjusts positions of the second lens group 320, the fourth lens group 340, and the light amount adjusting unit 350 in the optical axis direction by controlling the drive of the vibration wave drive apparatus 620, 640 and the meter 630 so as to obtain the determined exposure and an appropriate focus state. Under the control of the CPU 790, the vibration wave drive apparatus 620 moves the second lens group 320 in the optical axis direction, the vibration wave drive apparatus 640 moves the fourth lens group 340 in the optical axis direction, and the meter 630 drives and controls the light amount adjusting unit 350.

The position in the optical axis direction of the second lens group 320 driven by the vibration wave drive apparatus 620 is detected by a first linear encoder 770, and the detection result is notified to the CPU 790 to be fed back to the drive of the vibration wave drive apparatus 620. Similarly, the position in the optical axis direction of the fourth lens group 340 driven by the vibration wave drive apparatus 640 is detected by a second linear encoder 775, and the detection result is notified to the CPU 790, so as to be fed back to the drive of the vibration wave drive apparatus 640. The position of the light amount adjusting unit 350 in the optical axis direction is detected by a diaphragm encoder 780, and the detection result is notified to the CPU 790, so that it is fed back to the drive of the meter 630.

As described above, the imaging apparatus 700 according to the present embodiment includes the vibration wave drive apparatus 620, 640, the imaging element 710, and the CPU 790 functioning as an example of the controller for controlling the piezoelectric element 4 of the vibration wave drive apparatus 620, 640. The vibration wave drive apparatus 620, 640 includes the vibration wave motor described in the first to the third embodiments. The imaging apparatus 700 includes the second lens group 320 and the fourth lens group 340 as driven members.

With such a configuration, autofocus can be performed by using the imaging apparatus 700 and the vibration wave drive apparatus 620, 640. Further, by using the vibration wave drive apparatus 620, 640, it is possible to suppress the lowering of the drive characteristics when the lens group or the like is driven in the imaging apparatus 700.

Although the present disclosure has been described with reference to the embodiments described above, the present disclosure is not limited to the embodiments described above. Aspects of the disclosure modified to the extent not contrary to the spirit of the present disclosure and aspects equivalent to the present disclosure are also included in the present disclosure. The above-described embodiments and modifications can be suitably combined within a range not contrary to the spirit of the present disclosure.

According to one aspect of the present disclosure, the vibration type actuator which is capable of suppressing the reducing of the drive characteristic can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-124712, filed Jul. 29, 2021, which is hereby incorporated by reference herein in its entirety.

What is claimed is:

1. A vibration type actuator comprising:
   a vibrator including an electro-mechanical energy conversion element and an elastic member;
   a holding member configured to hold the vibrator;
   a guide member configured to guide the vibrator and the holding member in a first direction;
   a contact member in contact with the vibrator; and
   a pressure member configured to pressurize the vibrator and the contact member in a second direction intersecting the first direction,
   wherein the vibrator and the contact member are configured to generate power activating in the first direction by a vibration of the vibrator,
   the holding member and the guide member are engaged with each other to be rotatable around, as an axis, a third direction intersecting the first direction and the second direction, and
   the holding member is provided with a recess or a through-hole on an opposite side opposite a side where the vibrator is held, and an output portion configured to transmit the power is formed on at least a part of a wall surface on which the recess or the through-hole is formed.

2. The vibration type actuator according to claim 1, wherein the output portion is formed to protrude from a bottom surface of the recess provided in a flat plate portion of the holding member toward a surface side of the flat plate portion.

3. The vibration type actuator according to claim 2, wherein the output portion has an output point for transmitting the power to a driven member, and the output point is located at a position where a grip member of the driven member grips the output portion within the recess.

4. The vibration type actuator according to claim 1, wherein the output portion is located in the through-hole formed from a hold side on which the vibrator is held in a flat plate portion of the holding member to a side opposite the hold side.

5. The vibration type actuator according to claim 4, wherein the output portion has an output point for transmitting the power to a driven member, and the output point is located at a position where a grip member of the driven member grips the output portion inside the through-hole.

6. The vibration type actuator according to claim 1, wherein the holding member includes an engaging portion engaging with the guide member rotatably in the third direction as the axis, and a distance L1 from the engaging portion to the output portion in the second direction is substantially zero.

7. A vibration type actuator comprising:
   a vibrator including an electro-mechanical energy conversion element and an elastic member;
   a holding member configured to hold the vibrator;
   a guide member configured to guide the vibrator and the holding member in a first direction;
   a contact member in contact with the vibrator; and
   a pressure member configured to pressurize the vibrator and the contact member in a second direction intersecting the first direction, wherein the vibrator and the contact member are configured to generate power activating in the first direction by a vibration of the vibrator, the holding member and the guide member are engaged with each other to be rotatable around, as an axis, a third direction intersecting the first direction and the second direction, and an output portion configured to transmit the power to the holding member is provided so as to protrude in the second direction toward a vibrator side on which the vibrator is provided, beyond a portion on which the holding member presses the vibrator.

8. The vibration type actuator according to claim 7, wherein the output portion has an output point for transmitting the power to a driven member, and the output point is located at a position where a grip member of the driven member grips the output portion.

9. The vibration type actuator according to claim 1, wherein the holding member includes an engaging portion engaging with the guide member rotatably in the third direction as the axis, the axis of the engaging portion is assumed as a fulcrum, a point at which a pressure force applied by the pressure member acts on the holding member is assumed as an effort point, and a point at which the holding member presses the vibrator toward the contact member is assumed as a working point, a distance from the fulcrum to the working point in the first direction is represented by x1, a distance from the fulcrum to the effort point in the first direction is represented by x1+x2, a distance from the fulcrum to the output portion in the second direction is represented by L1, and a distance from the fulcrum to the working point in the second direction is represented by L2, and when an applied pressure applied by the pressure member to the effort point is represented by Rb, a thrust generated by the vibrator is represented by F1, and an applied pressure applied to the vibrator at the working point is represented by P, a relation of $0.1 \times (2Rb \times x2/x1) > |(L2-L1)F1/x1|$ is satisfied.

10. The vibration type actuator according to claim 9, wherein a distance L2 from the axis of the engaging portion to a point at which the holding member presses the vibrator toward the contact member in the second direction is substantially zero.

11. The vibration type actuator according to claim 1, wherein the axis is located at a position so that the axis protrudes in the second direction from a plane defined by the first direction, the third direction, and a point at which the holding member presses the vibrator toward the contact member, toward a side where the output portion is located.

12. The vibration type actuator according to claim 1, wherein two projections provided on the holding member pressurize the vibrator in the second direction at a common node of two different standing waves generated in the vibrator.

13. The vibration type actuator according to claim 12, wherein the output portion is located at a position substantially overlapping the two projections in the first direction.

14. The vibration type actuator according to claim 13, wherein the output portion is located at a position of a substantially central location of the two projections in the third direction, or a position symmetrical with the position of the substantially central location of the two projections in the third direction.

15. An imaging apparatus comprising:
the vibration type actuator according to claim 1;
an imaging element; and
a controller configured to control the electro-mechanical energy conversion element,
wherein the driven member includes a lens.

16. Electronic equipment comprising:
a driven member;
the vibration type actuator according to claim 1, configured to drive the driven member; and
a controller configured to control the electro-mechanical energy conversion element.

* * * * *